E. R. FELL.
LOCK FOR BICYCLES.
APPLICATION FILED JUNE 12, 1916.

1,218,540.

Patented Mar. 6, 1917.

Witness
Wm. Conway.

Inventor
Ellwood R. Fell,
By Foster and Webster
His Attorneys

UNITED STATES PATENT OFFICE.

ELLWOOD R. FELL, OF PHILADELPHIA, PENNSYLVANIA.

LOCK FOR BICYCLES.

1,218,540.  Specification of Letters Patent.  Patented Mar. 6, 1917.

Application filed June 12, 1916. Serial No. 103,098.

*To all whom it may concern:*

Be it known that I, ELLWOOD R. FELL, a citizen of the United States, residing at Philadelphia, in the county of Philadelphia and State of Pennsylvania, have invented certain new and useful Improvements in Locks for Bicycles, of which the following is a specification.

My invention relates to improvements in locks for bicycles, the object of the invention being to provide a device of the character stated which is secured to, and carried by the bicycle and always in convenient position for locking the wheel whenever desired.

A further object is to provide a lock of the character stated which is of extremely inexpensive construction, strong and durable in use.

With these and other objects in view my invention consists in certain novel features of construction and combinations and arrangements of parts as will be more fully hereinafter described and pointed out in the claims.

Figure 1:
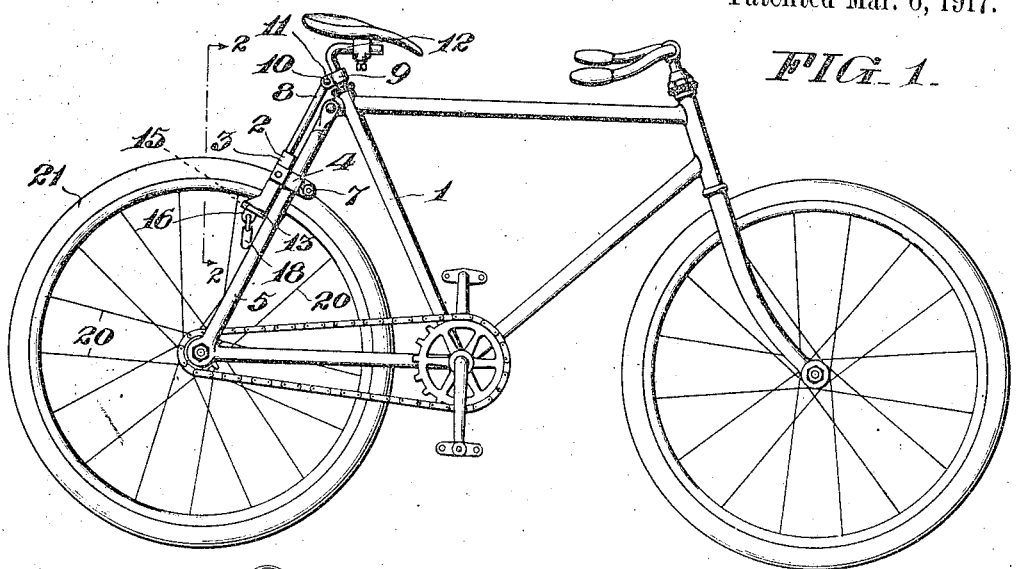
Figure 1 is a view in side elevation illustrating my improvements in locked position on a bicycle.

1 represents a bicycle of ordinary type to which my improved lock 2 is secured as will now be described.

The lock 2 is made with a bifurcated frame 3 having clamps 4 on the two members thereof, which are secured to the members of the bicycle rear fork 5 by means of bolts 6 and nuts 7.

An upwardly projecting rod 8 is secured to frame 3 and carries a collar 9 at its upper end. This collar 9 is made with parallel perforated ears 10, between which the upper end of rod 8 is pivotally secured by a rivet 11 so that the collar may take varying angles in accordance with the structure of the bicycle.

The collar 9 is positioned around the seat post 12 but does not interfere with the adjustment of the seat post to suit the rider.

A hasp 13 is pivotally connected by means of rivet 14 with one member of the bifurcated frame 3, and adjacent its other end is made with a slot 15 to receive a perforated lug 16 on the lower end of frame 3. This is the locking position of the hasp as shown in full lines in Fig. 2, and a padlock 18 is positioned through the perforated lug 16 and prevents fraudulent manipulation of the hasp.

Figures 2, 3, 4:
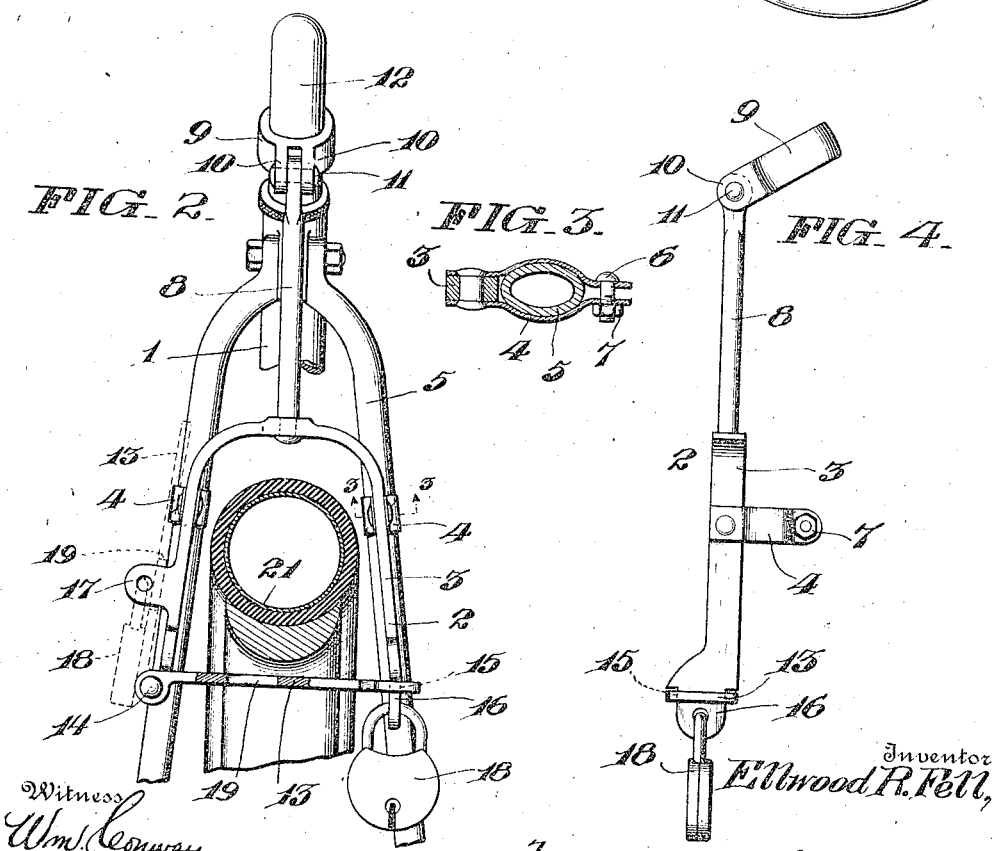
Fig. 2 is an enlarged fragmentary view in section on the line 2—2 of Fig. 1.
Fig. 3 is a view in section on the line 3—3 of Fig. 2.
Fig. 4 is a view in side elevation of the lock removed.

The hasp 13 is provided with a slot 19 which receives the perforated lug 17 on one side of the frame 3 when the hasp is swung upwardly out of its locked position as shown in dotted lines in Fig. 2. The padlock 18 is positioned through the perforated lug 17 and not only operates to secure the hasp in its vertical position but is ready for use whenever it is desired to lock the wheel.

As shown clearly in the drawing, whenever the hasp 13 is in locked position, it is projected through the rear wheel 21 between the spokes 20 and when in this position securely locks the wheel even though the frame should be disconnected from the bicycle frame.

The device is carried by the bicycle in convenient position for use, and affords a securing means which prevents turning movement of the wheel.

While I have referred to the device as a lock for bicycles, I would have it understood that I do not limit myself to any particular form of wheeled vehicle as my improvements are adapted for use on various vehicles, but is especially adapted for bicycles, motorcycles, tricycles and the like.

Various slight changes may be made in the general form and arrangement of parts described without departing from my invention and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. A device of the character described, comprising a bifurcated frame adapted to straddle the wheel, clamps on the members of said bifurcated frame adapted to secure the same to a support, a hasp hinged to one end of the frame, perforated lugs on both ends of the bifurcated frame, said hasp having slots therein adapted to receive the said lugs in accordance with the position of the hasp and a lock adapted to secure the hasp to either of said lugs.

2. The combination with a vehicle, having a rear fork, a wheel in the rear fork, and a seat post adjacent the upper end of the fork, of a bifurcated frame, a rod projecting upwardly from the frame, a collar pivotally secured to the rod and through which the seat post is positioned, a hasp carried by the frame and adapted to be positioned through the wheel, and a padlock adapted to secure the hasp against movement.

3. The combination with a vehicle, having a rear fork, a wheel in the rear fork, and a seat post adjacent the upper end of the fork, of a bifurcated frame, a rod projecting upwardly from the frame, a collar pivotally secured to the rod and through which the seat post is positioned, a hasp carried by the frame and adapted to be positioned through the wheel, clamps on the bifurcated frame secured to the members of the fork, lugs on the frame, and a padlock adapted to secure the hasp to either of said lugs, one of said lugs adapted to engage the hasp in its locked position and the other in its unlocked position.

In testimony whereof I have signed my name to this specification in the presence of two subscribing witnesses.

ELLWOOD R. FELL.

Witnesses:
ELEANOR F. MARSAY,
WILLIAM CONWAY.